United States Patent Office 3,305,353
Patented Feb. 21, 1967

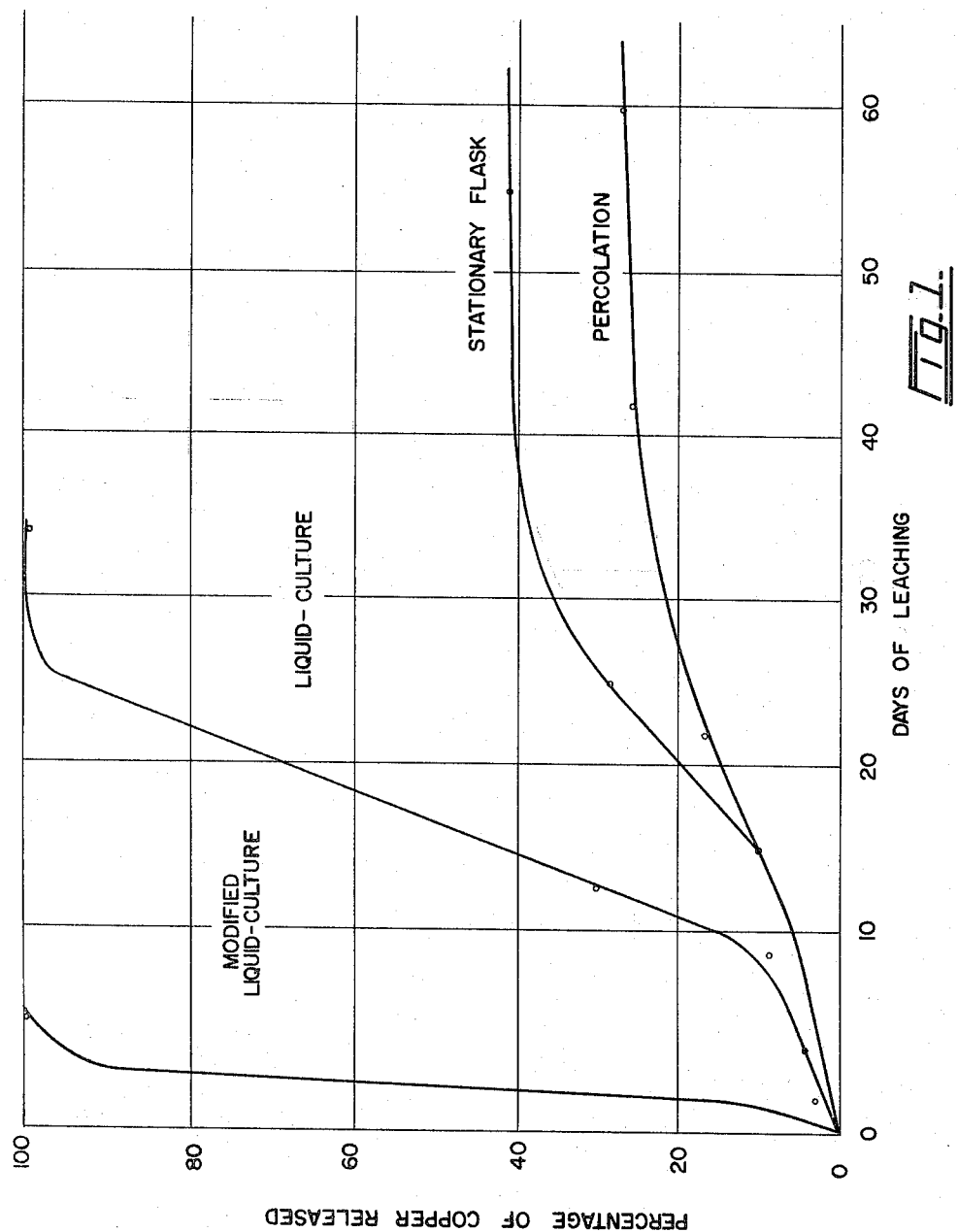

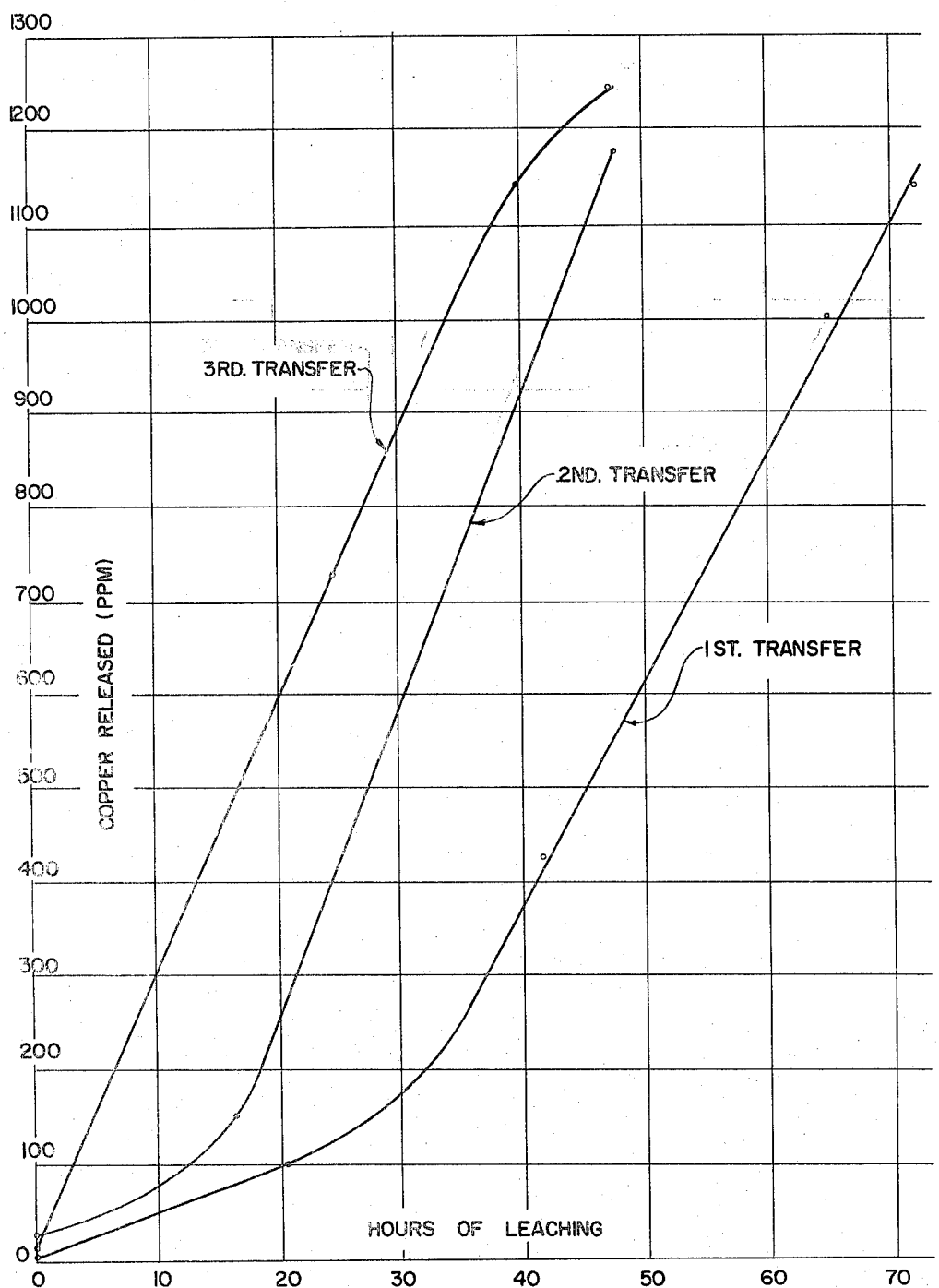

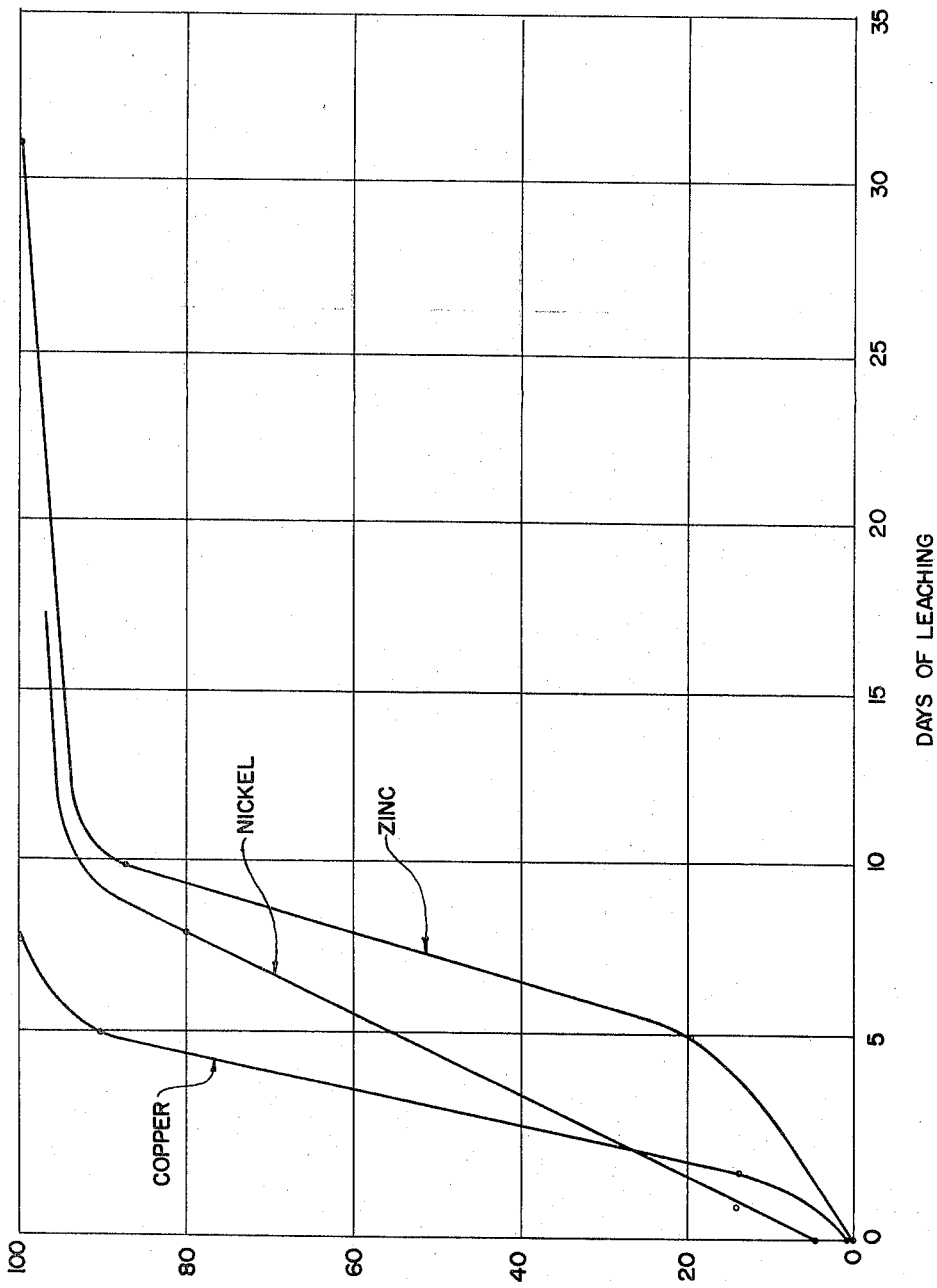

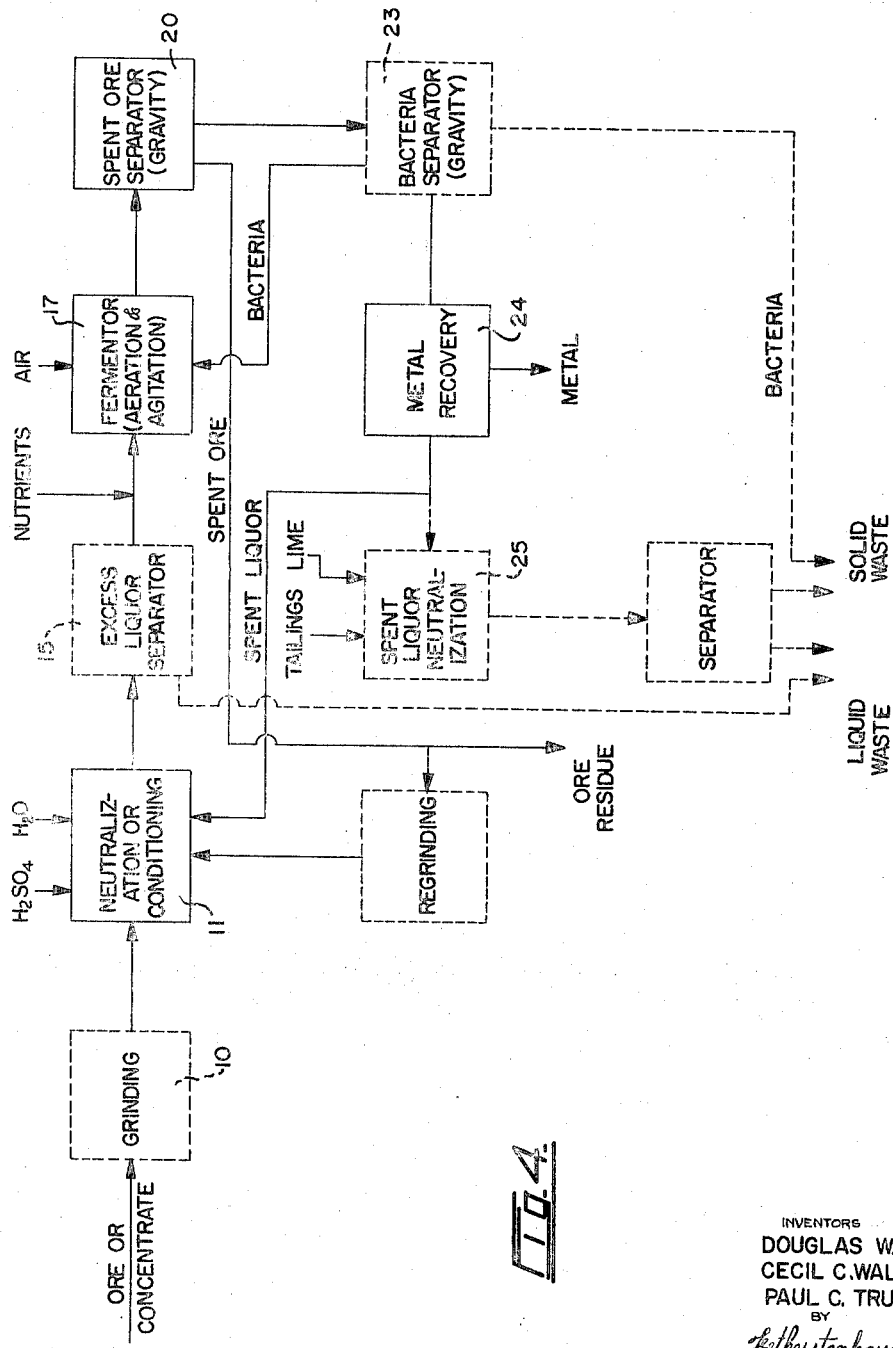

3,305,353
ACCELERATED MICROBIOLOGICAL ORE
EXTRACTION PROCESS
Douglas W. Duncan, Cecil C. Walden, and Paul C. Trussell, Vancouver, British Columbia, Canada, assignors to British Columbia Research Council, Vancouver, British Columbia, Canada
Filed Mar. 30, 1964, Ser. No. 355,876
10 Claims. (Cl. 75—101)

This invention relates to an accelerated microbiological process for the extraction of metals from ores, concentrates and minerals.

An object of the present invention is the provision of a microbiological process for extracting metals from ores in a much shorter time than has heretofore been possible, reducing the time to a few hours instead of weeks or months as in the past.

Another object is the provision of a process for bacteriologically extracting a much higher percentage of metal from sulfuritic ores than has been possible up to the present time.

Another object is the provision of a process for bacteriologically extracting metals from ores in relatively pure form, thereby eliminating the necessity of further treatment in smelters.

A further object is the provision of a process for bacteriologically extracting metals from sulfuritic ores without the generation of sulphur dioxide which pollutes the atmosphere.

Yet another object is the provision of a simple process of the nature described which can be carried out at the mine so that it is not necessary to transport impure ore material and/or concentrates away from the mine.

A still further object is the provision of a process for bacteriological extraction of metals from sulfuritic ores which makes it possible to recover the minor constituents of the ores in an economical manner, and which produces waste liquid which can be used for pile leaching.

The leaching of metals from sulfide ores by bacteria has been known and carried out artificially for a great many years. The first realization that a certain type of bacteria are capable of oxidizing sulfide sulfur in combination with metals was advanced by Colmer and Hinkle in 1947. The name *Thiobacillus ferrooxidans* was assigned to this bacteria about 1951.

The activity of *Thiobacillus ferrooxidans* in bringing metals into solution by oxidation of sulfide ores has been studied by a number of investigators. The methods used simulated the natural process by percolating water or a nutrient-salt solution through a bed of crushed or powdered mineral or ore seeded with *Thiobacillus ferrooxidans*.

By the percolation method, copper was extracted bacteriologically from chalcopyrite, chalcocite, covellite and bornite (L. C. Bryner, J. D. Beck, D. B. Davis and D. G. Wilson, 1954); and molybdenum from molybdenite (L. C. Bryner and R. Anderson, 1957). However, rates of extraction by this percolation method were impractically slow for commercial, in-plant operation. Bryner et al. (1954) released only 2.8% of the copper from one chalcopyrite sample in 70 days and 6.6% from another in 56 days. In subsequent investigations Malouf and Prater (1961) leached 50% of the copper from their sample of chalcopyrite in 178 days and a total of 60% in 470 days. Razzell (1962) released 25% of the copper from chalcopyrite in 60 days. These excessively long leach times and poor yields were a definite limitation to the industrial application of microbiological leaching.

Attempts to improve the leaching rate by using finely-ground ore in shallow (½") layers of nutrient-salt medium in stationary flasks (Razzell and Trussell, 1963) gave extractions of 40% of the copper from chalcopyrite in 55 days.

The problems of the past have been greatly reduced or eliminated and the above-mentioned advantages are attained by the process which comprises contacting sulfuritic ore, preferably finely ground, with cells of *Thiobacillus ferrooxidans* to produce oxidation of ferrous iron, if present, and sulfide in the ore, while at the same time agitating and/or aerating the mixture. The process is improved by using *Thiobacillus ferrooxidans* which have adapted or mutated through prior contact with this type of ore. It is also preferable to carry out the process in the presence of suitable bacterial nutrients.

The present invention contemplates the process for bacteriological extraction of metals from sulfuritic ores, which comprises exposing the ore to an aqueous leaching medium for metallic sulfides and containing sulfide-oxidizing bacteria while subjecting the ore, leaching medium and bacteria to agitation and aeration of the solution. This process is improved by supplying air and/or oxygen to the solution during agitation thereof, and/or using bacteria which had previously been repeatedly exposed to sulfuritic ore and transferred while still actively growing in a similar leaching medium. It is desirable to maintain the pH of the solution between about 1.5 and about 3.0. The temperature may range from 20° to 45° C., but the preferred range is from about 30° to about 45° C. Bacterial nutrients must also be added to the solution.

In the accompanying drawings,

FIGURE 1 is a graph illustrating the percentage of copper released and the days of leaching by two prior processes and by two processes according to the present invention, FIGURE 2 is a graph illustrating the effect on the process by the utilization of bacteria that had previously passed through similar processes, FIGURE 3 illustrates the results attained by the utilization of this process in connection with sulfides for the extraction of nickel, zinc and copper, and FIGURE 4 is a schematic system for the recovery of metal from sulfuritic ore concentrates.

The effectivess of this new bacterial leaching process for mineral and ore sulfides is illustrated in FIGURE 1, where leaching rates are compared for the percolation method, the stationary flask technique, liquid-culture method (involving aeration and agitation) and the modified liquid-culture method, using *Thiobacillus ferrooxidans* which have adapted or mutated for maximum utilization of ferrous iron and sulfide from solid sources. Museum-grade chalcopyrite mineral, ground to pass a 325-mesh sieve, has been used in the four experiments of FIGURE 1, and the liquid medium has contained 3.0 g. of ammonium sulfate, 0.1 g. of potassium chloride, 0.5 g. of dipotassium hydrogen phosphate, 0.5 g. of magnesium sulfate heptahydrate, and 0.1 g. of calcium nitrate per liter of water. The medium is acidic due primarily to the presence of ammonium sulfate which in aqueous solution, constitutes an aqueous mineral, i.e. sulfuric, acid solution which is compatible with the sulfide-oxidizing bacteria.

For those curves labelled "percolation method" and "stationary flask," the techniques used were those outlined by Bryner et al. (1954) and by Razzell and Trussell (1963). In both cases, *Thiobacillus ferrooxidans* was used as an inoculum. In the "liquid-culture" method, 1 gram of mineral has been suspended in a 250-ml. flask with 75 ml. of medium containing 30 p.p.m. of sorbitan polyoxyethylene monolaurate, inoculated with a concentrate of an 8–10 day culture of *Thiobacillus ferrooxidans* and placed on a gyratory shaker at 35° C. With the modified liquid-culture method, experimental conditions were identical except the inoculum was a 1 ml. volume of a 5-day culture of *Thiobacillus ferrooxidans* which had been repeatedly transferred from the above medium with 0.9% added ferrous iron, at weekly intervals over a period of several months.

The extremely long periods of time involved in the extraction of metal by the percolation and the stationary flask methods vitiate any possibility of applying similar techniques commercially, except as per existing methods of leaching piles of low-grade ore or tailings or by in situ leaching in mines by drainage waters. The improvement of the liquid-culture methods in the leaching of metals is emphasized in FIGURE 1, where the times involved are reduced from as much as 75 to as little as 3 days and the amount of extraction is increased from 25 to over 95%. The liquid culture method differs from previous techniques by providing aeration and agitation. The increased rates of bacterial activity achieved are due to an increased supply of oxygen and the improved opportunity of the bacterial cells to contact the mineral surfaces. The modified-liquid culture method possesses these above advantages and in addition the *Thiobacillus ferrooxidans* has adapted or mutated so that its various enzyme systems and other mechanisms for converting ferrous to ferric ions and sulfide to sulfate ions, are functioning at a maximum level of activity.

The acceleration in leaching rates achieved by the adaptation or mutation of the *Thiobacillus ferrooxidans* is illustrated in FIGURE 2. Initial rates have already been improved by the organism adapting or mutating for maximum utilization of ferrous iron by repeated transfer in a liquid medium containing 0.9% ferrous sulfate. The further improvement shown in FIGURE 2 is achieved as the organism adapts or mutates to maximum utilization of both ferrous iron and the sulfide in chalcopyrite mineral when new batches of the mineral are repeatedly brought into contact with the bacteria. Not only is the rate of metal leaching increased, but the time period which elapses before leaching begins is virtually eliminated.

An illustration of how this invention may be used commercially is exemplified by the following data for a mine and mill operation in the Province of British Columbia, Canada. Daily the mine produces 4600 tons of chalcopyrite ore with a copper content of 1.2%. This ore is concentrated in the mill, with a recovery of 96%, to 182 tons of concentrate containing 28% copper (chalcopyrite —$CuFeS_2$— is 34.5% copper) with a moisture content of 8%. With a 2-day fermentation period, and a dry ore-medium ratio of 1 to 25, a submerged culture fermentation tank of 268,000 cu. ft. will suffice to process the entire output of this mill to soluble copper. Such a tank could be 10 feet deep, 100 feet wide by 268 feet long. Suitable aeration equipment, as used in activated sludge sewage treatment plants, is commercially available. Fermentations of this nature are entirely feasible commercially, particularly since no difficulties are experienced in maintaining sterility at the low pH values at which *Thiobacillus ferrooxidans* is active. Copper is readily recovered from solution by displacement with a chemical equivalent of iron metal or by electrodeposition. The electricity required for electrodeposition is about 0.77 kwh. per lb. of copper following elimination of the ferric iron by precipitation as the hydroxide at a pH of 3.0 to 3.5.

FIGURE 3 shows the technique applied to other sulfides for the extraction of nickel and zinc.

Although the submerged-culture fermentation technique has been applied for many years to water-soluble substrates, the action here is on a finely-divided, but solid substrate material. The key to the rapid bacterial action on the solid substrate is the supply of oxygen in the form of air and agitation to permit bacteria-mineral contact and/or adaptation or mutation of the organism to maximum use of ferrous iron and sulfide.

In the system shown in FIGURE 4, ore is ground by conventional ore-milling equipment 10 to a particle size less than 200 mesh per inch, then concentrated by flotation or other methods common to the practice. The finely divided concentrated ore, now free of the bulk of extraneous material (gangue) is introduced into a conditioning tank 11 where it is acidified to a pH ranging between 1.5 and 3.0 with spent liquor from a later stage in the process and, if necessary, additional acid. The preliminary removal of gangue, which usually has a high acid demand, greatly reduces the acid requirements at this stage. Depending on the requirement of *Thiobacillus ferrooxidans* fresh water may be added at this stage. All of the spent liquor from a later stage in the process may be required for neutralization of the concentrate, whereas some dilution of this spent liquor may be required to reduce the concentration of the end products of bacterial metabolism. Where this is necessary, excess diluted spent liquor becomes waste at stage 15 of the process and is separated for removal. Bacteria, being recycled from a later stage of the process, and nutrients are added to the acidified slurry of ground ore as it passes to the fermentation tank 17.

In the fermenter 17, air is introduced to provide oxygen for the bacteria and to facilitate their contacting the sulfide ore. The thin slurry of bacteria and acidified concentrate may be fermented either on a batch basis or on a continuous basis. In the continuous process the slurry feeds into one end of the fermenter and products of the hydrometallurgical extraction out the other. The latter pass to a gravity separator 20 which removes the particulate material from the liquor. Depending on the extraction achieved, the particulate residue from the fermenter may be discarded or may be reground prior to further bacterial leaching. The liquor, which still contains a large amount of bacterial cells, may pass to a bacterial separator 23 or pass directly to a metal recovery stage 24 where the metal is removed in solution by electrical or chemical deposition. All or a portion of the spent liquor from the metal recovery stages goes to the conditioning tank 11 and any balance, together with any excess of diluted spent liquor, passes to a waste treatment system 25 that removes any solid material and neutralizes the liquid portion before disposal. Alternatively, the excess spent liquor may be used for pile leaching of low-grade ore. The solution is acidic and is ideal for conditioning ore for bacteriological leaching.

The economic advantage of this novel system for treatment of ore concentrates and minerals arises from the fact that transport of impure ore, concentrates and minerals to a smelter may be unnecessary. A relatively pure form of the metal is produced rather than a concentrate of the ore. For example, with chalcopyrite ore, a commercial concentrate will contain 28–30% copper. Pure chalcopyrite contains only 34.5% copper, the remainder being the iron and sulfide in the cupric ferrous sulfide. The product of this invention is relatively pure copper, about 90–95%. Thus the transportation charges for delivering the mill product to the smelter or market are reduced to approximately one-third. This enables economic removal of metal from ore beds in remote areas that might not otherwise be feasible to exploit.

A further potential advantage of this invention rests in the purity of the metal end-product of this process. This metal end-product can be refined to a commercial product without the extensive processing required with conventional smelter techniques. For example, if the metal is recovered from the leach solution by electrolytic deposition, improvements in this technique may result in a product of commercial qualities, thereby obviating the smelting and refining. This is an obvious step, since the principal function of the smelting technique is the removal of the sulfide, a step which is accomplished by the bacterial leaching technique.

The proposed method of treatment, being a hydrometallurgical process, eliminates the generation of sulfur dioxide which is frequently an atmospheric pollutant in the processing of many sulfuritic ores.

Another advantage of this method, is the recovery of minor constituents of the ore. If they are soluble, repeated use of the leaching solution will allow their concentration to increase to a point where their economic retrieval is possible. Insoluble constituents will be concentrated in the residue, whose small volume will allow easy handling and recovery using standard procedures. Such minor constituents frequently have a high value per unit of weight.

As mentioned above, the excess liquid waste from the proposed treatment system for ore concentrates can be applied to pile leaching wherein the acid generated by bacterial oxidation of the sulfides to sulfates can be used to advantage.

The aerated fermentation leaching process has many advantages over the well-known pile or heap leaching process. Heap leaching is restricted in its application to ores whose gangues are of low alkalinity which can be economically maintained at pH 1.5–3.0. This considerably limits heap leaching. A further limitation of heap leaching is the difficulty of maintaining optimum leaching temperatures during cold weather. The rate of leaching is most rapid at 35° C. and drops rapidly as the temperature is lowered. Although the bacterial oxidation of sulfides is exothermic, it is difficult to maintain proper leaching temperatures in piles; this is not a problem in a fermenter. The fermentation process also permits more exacting control of nutrients, acidity (pH), air supply and other factors conducive to maximum bacterial oxidation rates than can be achieved in heap leaching.

Another advantage of the fermenter leaching process over the heap leaching process is that the former is not subject to the complications that may arise in the heap leaching process, such as clogging the piles by iron precipitating as ferric hydroxide. Because of losses through seepage and evaporation, the available supply of water can become a limiting factor in the rate of metal extraction in heap leaching, particularly in dry climates. In the aerated fermenter process, water losses are kept to a minimum and water supply is less of a limiting factor.

The application of the aerated fermenter process is conceived for sulfuritic ores which can be oxidized bacterially to sulfates. Laboratory tests with ores of copper, zinc, molybdenum, arsenic and nickel have been found suitable for processing by this method. Other possibilities include gold, silver, cobalt, tin, cadmium and the rare earth metals as listed in the periodic table.

What we claim as our invention is:

1. A method of bacteriological extraction of metals from materials comprising metallic sulfides which process comprises contacting particles of said material with an aqueous acidic leaching medium, said medium comprising a mineral acid, sulfide-oxidizing bacteria and nutrient for said bacteria, subjecting the leaching medium to agitation to maintain said particles suspended in said medium, and aerating said medium during said agitation to provide oxygen for the oxidation of said sulfide by said bacteria.

2. A method according to claim 1 wherein said leaching medium is maintained at a pH of from about 1.5 to about 3.0 during said process.

3. A method according to claim 1 wherein said material is selected from the group consisting of ores, concentrates and minerals.

4. A method according to claim 1 wherein said bacteria has been grown on similar sulfuritic material prior to use in said extraction process.

5. A method according to claim 2 wherein the temperature of the leaching medium is maintained at from about 20° C. to about 45° C. during said process.

6. A method according to claim 5 wherein said temperature is at least 30° C.

7. A method according to claim 1 wherein said bacteria comprise *Thiobacillus ferrooxidans*.

8. A method according to claim 7 wherein said *Thiobacillus ferrooxidans* have been grown on similar sulfuritic material prior to use in said extraction process.

9. A method according to claim 1 wherein said metallic sulfide comprises at least one selected from the group consisting of sulfides of copper, zinc, molybdenum, arsenic, nickel, gold, silver, cobalt, tin, cadmium, and the rare earth metals.

10. A method according to claim 9 wherein said metal sulfide comprises at least one selected from the group consisting of copper zinc and nickel.

References Cited by the Examiner

UNITED STATES PATENTS 2,829,964  4/1958  Zimmerly et al. _____ 75—101
3,218,252  11/1965  Glover et al. _____ 75—104

OTHER REFERENCES

Sutton et al.: "Leaching Copper Sulfide Minerals With Selected Autotrophic Bacteria," Bureau of Mines Report of Investigations 6423, 1964.

DAVID L. RECK, *Primary Examiner.*

N. F. MARKVA, *Assistant Examiner.*